United States Patent
DiSalvo et al.

(10) Patent No.: US 11,755,550 B2
(45) Date of Patent: *Sep. 12, 2023

(54) SYSTEM AND METHOD FOR FINGERPRINTING-BASED CONVERSATION THREADING

(71) Applicant: RELATIVITY ODA LLC, Chicago, IL (US)

(72) Inventors: Michael DiSalvo, Golden, CO (US); Jeffrey Gilles, Fairfax, VA (US); Brandon Gauthier, Centreville, VA (US)

(73) Assignee: RELATIVITY ODA LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/953,108

(22) Filed: Sep. 26, 2022

(65) Prior Publication Data

US 2023/0024532 A1     Jan. 26, 2023

Related U.S. Application Data

(63) Continuation of application No. 16/910,757, filed on Jun. 24, 2020, now Pat. No. 11,481,369, which is a
(Continued)

(51) Int. Cl.
*G06F 16/00* (2019.01)
*G06F 16/215* (2019.01)
(Continued)

(52) U.S. Cl.
CPC .......... *G06F 16/215* (2019.01); *G06F 16/325* (2019.01); *G06F 16/93* (2019.01); *H04L 51/216* (2022.05)

(58) Field of Classification Search
CPC ....... G06F 16/215; G06F 16/93; G06F 16/325
(Continued)

(56) References Cited

U.S. PATENT DOCUMENTS

2004/0054906 A1* 3/2004 Carro ................... H04L 9/3236
                                                    713/176
2004/0221295 A1* 11/2004 Kawai .................. G06F 16/285
                                                    719/313
(Continued)

*Primary Examiner* — Chelcie L Daye
(74) *Attorney, Agent, or Firm* — MARSHALL, GERSTEIN & BORUN LLP

(57) ABSTRACT

Systems, methods, and computer readable media for staging a corpus of electronic communication documents for analysis, such as, for example, via a content analysis platform. The staging may include a staging platform accessing the corpus of electronic communication document. For each electronic communication document within the corpus, the staging platform may generate a fingerprint based upon the output of a hash function executed upon a set of characteristics corresponding to each segment within the electronic communication document. The staging platform may analyze the generated fingerprints to generated a plurality of threaded conversations that do not include electronic communication documents that fail to convey any new information. The systems and methods may also include detecting and flagging any segments within an electronic communication document that may have been mutated by its author.

20 Claims, 4 Drawing Sheets

Related U.S. Application Data continuation of application No. 15/205,980, filed on Jul. 8, 2016, now Pat. No. 10,698,871.

(51) Int. Cl.
*G06F 16/93* (2019.01)
*G06F 16/31* (2019.01)
*H04L 51/216* (2022.01)

(58) Field of Classification Search
USPC .......................................................... 707/692
See application file for complete search history.

(56) References Cited

U.S. PATENT DOCUMENTS

| | | | |
|---|---|---|---|
| 2009/0012984 A1* | 1/2009 | Ravid | G06V 30/416 |
| 2009/0234924 A1* | 9/2009 | Edelen | G06F 16/35 |
| | | | 707/999.1 |
| 2013/0124548 A1 | 5/2013 | Chhaparia et al. | |

* cited by examiner

Sent: Wednesday, October 23, 2003 2:07 PM
To: Paul Allen <pallen@enron.com>; John Arnold <jarnold@enron.com>
Subject: Feedback requested
Attach: ConfidentialEnron.docx Hi All, Could you take a look at the attached document and give me some feedback?

Thanks!
Mike

Mike Maggie | Enron
mmaggie@enron.com
www.enron.com

Fingerprint:
23233c+

Sent: Wednesday, October 23, 2003 5:08 PM
To: Mike Maggie <mmaggie@enron.com>
CC: Paul Allen <pallen@enron.com>
Subject: RE: Feedback requested
Attach: ConfidentialEnron.docx Hi Mike, Please see my feedback in the attached document.

Regards,

John Arnold | Enron
(773) 555-5919
jarnold@enron.com

From: Mike Maggie
Sent: Wednesday, October 23, 2003 2:07 PM
To: Paul Allen <pallen@enron.com>; John Arnold <jarnold@enron.com>
Subject: Feedback requested
Attach: ConfidentialEnron.docx Hi All, Could you take a look at the attached document and give me some feedback?

Thanks!
Mike

Mike Maggie | Enron
mmaggie@enron.com
www.enron.com

Fingerprint:
23233c+6f b18d+

Root Segment
(Segment 0)

Segment 1

Sent: Wednesday, October 23, 2003 9:12 PM
To: Paul Allen <pallen@enron.com>
CC: John Arnold <jarnold@enron.com>
Subject: FW: RE: Feedback requested
Attach: ConfidentialEnron.docx Paul, what do you think?

Thanks,

Mike Maggie
Sent from my mobile device.

From: John Arnold
Sent: Wednesday, October 23, 2003 5:08 PM
To: Mike Maggie <mmaggie@enron.com>
CC: Paul Allen <pallen@enron.com>
Subject: RE: Feedback requested
Attach: ConfidentialEnron.docx Hi Mike, Please see my feedback in the attached document.

Regards,

John Arnold | Enron
(773) 555-5919
jarnold@enron.com

From: Mike Maggie
Sent: Wednesday, October 23, 2003 2:07 PM
To: Paul Allen <pallen@enron.com>; John Arnold <jarnold@enron.com>
Subject: Feedback requested
Attach: ConfidentialEnron.docx Hi All, Could you take a look at the attached document and give me some feedback?

Thanks!
Mike

Mike Maggie | Enron
mmaggie@enron.com
www.enron.com

Fingerprint:
23233c+6f b18d+ef45b5+

Segment 2

Segment 1

Root Segment
(Segment 0)

FIG. 2

SYSTEM AND METHOD FOR FINGERPRINTING-BASED CONVERSATION THREADING

CROSS-REFERENCE TO RELATED APPLICATIONS

This is a continuation of U.S. patent application Ser. No. 16/910,757, filed on Jun. 24, 2020 and entitled "System and Method for Fingerprinting-Based Conversation Threading", which is a continuation of U.S. patent application Ser. No. 15/205,980, filed on Jul. 8, 2016 and entitled "System and Method for Fingerprinting-Based Conversation Threading." The disclosures are hereby incorporated herein by reference in their entirety.

FIELD OF THE DISCLOSURE

The present disclosure generally relates to electronic communication threading and, more specifically, to processing techniques for threading electronic communications based upon knowledge gleaned from fingerprinting electronic communications.

BACKGROUND

In various applications, a need exists to extract meaningful information from a corpus of electronic communication documents. In the eDiscovery process commonly associated with litigation, for example, attorneys are commonly provided a voluminous corpus of electronic communication documents that conform to the discovery request. Analyzing each and every electronic communication document is a time consuming process. Further, many of these electronic communication documents convey redundant information. In an email context, the corpus of emails may include a copy of the email from the sender's outbox, as well as the inbox of each recipient. A reviewer does not need to review each copy of the email to determine whether or not the email is relevant to the discovery process. As another email example, an email message may include information relating to previous responses within an email chain. An "end email" will contain all of the information conveyed by prior emails within the conversation. Consequently, these prior emails can safely be discarded without losing any meaningful information.

Email threading is a process that reduces the volume of electronic communication documents in the corpus of electronic communication documents by removing electronic communication documents that fail to convey new information. An electronic communication document may convey new information, if, for example, the electronic communication document includes a new recipient or attachment, the subject and/or the body of the electronic communication document is not included in any other emails, or the electronic communication document is an "end document." However, email threading is a computationally intensive process for a large corpus of electronic communication documents. While each individual electronic communication document may be relatively small, it is not uncommon for a corpus to include over 100,000,000 electronic communication documents. As a result, there is a need to develop document analysis techniques that can reduce the processing required to identify whether or not a particular electronic communication document conveys new information, thereby improving the functionality of the computing system itself.

BRIEF SUMMARY

In one aspect, a method for staging a corpus of electronic communication documents is provided. The method may be implemented by one or more processors of a computing system. The method may comprise (1) accessing, by the one or more processors, the corpus of electronic communication documents; (2) normalizing, by the one or more processors, the corpus of electronic communication documents; (3) for each electronic communication document within the corpus of electronic communication documents generating, by the one or more processors, a fingerprint for the electronic communication document, wherein the fingerprint is derived from an output of a hash function for at least an author and a date of each segment within the electronic communication document; and (4) based upon the respective fingerprints, generating, by the one or more processors, a plurality of threaded conversations from the corpus of electronic communication documents.

In another aspect, a system for staging a corpus of electronic communication documents is provided. The system may comprise a first memory storing the corpus of electronic communication documents and a computing device comprising one or more processors and a second memory. The second memory may store non-transitory, computer-readable instructions that, when executed by the one or more processors, cause the computing device to process the corpus of electronic communication documents to generate a plurality of threaded conversations, wherein processing includes (1) normalizing the corpus of electronic communication documents; (2) for each electronic communication document within the corpus of electronic communication documents, generating a fingerprint for the electronic communication document, wherein the fingerprint is derived from an output of a hash function for at least an author and a date of each segment within the electronic communication document; and (3) based upon the respective fingerprints, generating the plurality of threaded conversations from the corpus of electronic communication documents.

In another aspect, a non-transitory computer-readable storage medium storing processor-executable instructions is provided. The instructions, when executed, cause one or more processors to (1) access a corpus of electronic communication documents; (2) normalize the corpus of electronic communication documents; (3) for each electronic communication document within the corpus of electronic communication documents, generate a fingerprint for the electronic communication document, wherein the fingerprint is derived from an output of a hash function for at least an author and a date of each segment within the electronic communication document; and (4) based upon the respective fingerprints, generate a plurality of threaded conversations from the corpus of electronic communication documents.

BRIEF DESCRIPTION OF THE DRAWINGS

FIG. 2 depicts an example electronic communication conversation and the corresponding fingerprints for each electronic communication document therein, according to one embodiment and scenario.

DETAILED DESCRIPTION

I. Overview

Figure 1:
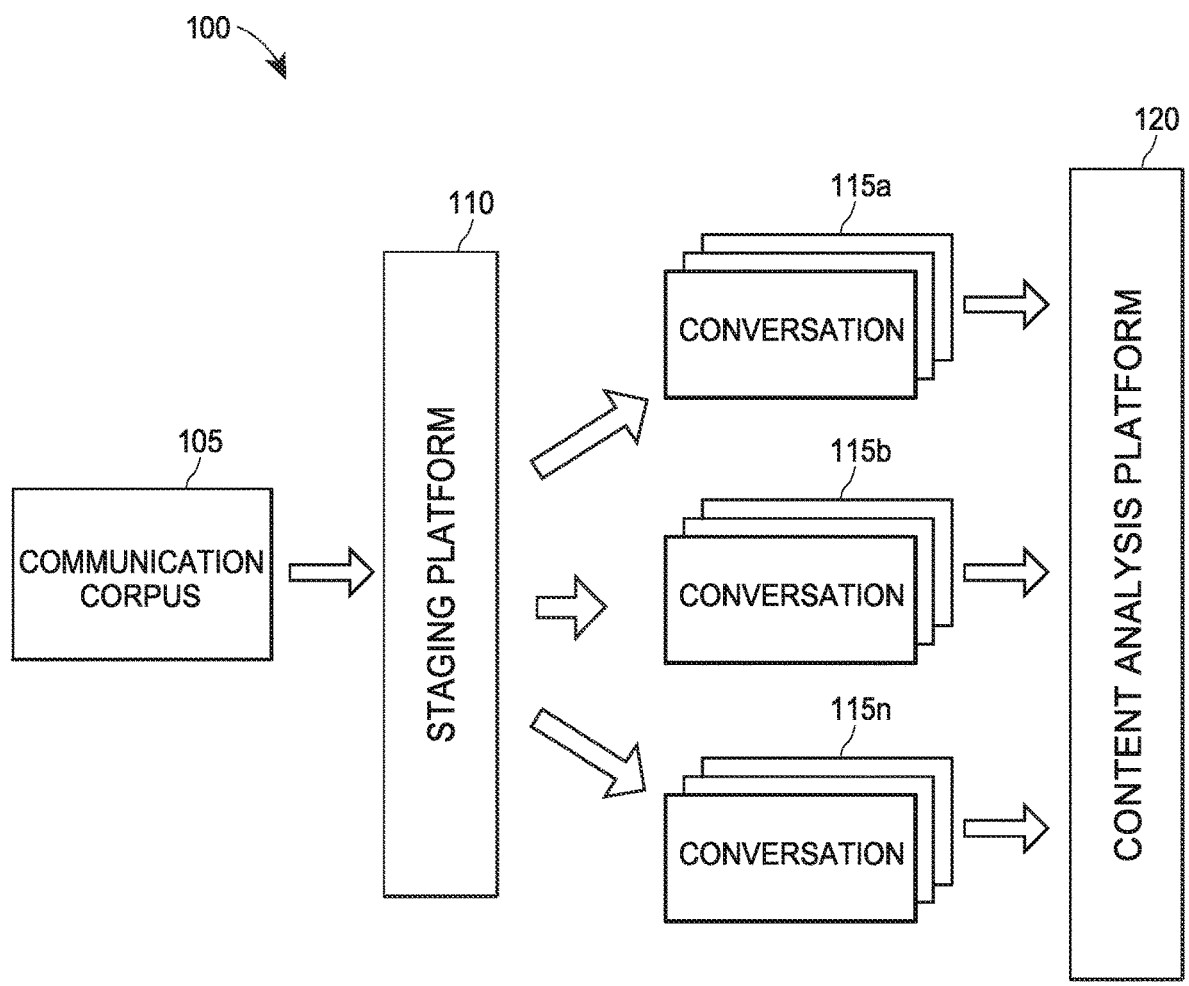
FIG. 1 depicts an example computing process in which a corpus of electronic communication documents undergoes a staging process prior to analysis via a content analysis platform, according to one embodiment.

The embodiments described herein relate to, inter alia, the conversion of a corpus of electronic communication documents into a plurality of threaded conversations. The systems and techniques described herein may be used, for example, to stage the corpus of electronic communication documents for ingestion into a tool or platform of the sort commonly used during litigation. Although the present disclosure generally describes the techniques' application to the eDiscovery and/or litigation context, other applications are also possible. For example, the systems and techniques described herein may be used by a company or other entity to categorize and/or review its own archived electronic communication documents and/or for other purposes.

As it is generally used herein, "electronic communication document" refers to an electronic document that represents an exchange between one or more individuals. While many of the examples described herein refer to email, it should be appreciated that the techniques described herein are applicable to other types of electronic communication documents. For example, some instant messaging applications may archive a conversation upon its conclusion. The electronic file that represents the instant messaging conversation may be considered an "electronic communication document." As another example, social media platforms may support their own form of messaging (e.g., a Facebook message, an Instagram direct message, etc.). These messages may also be considered an "electronic communication document." Furthermore, recent email platforms like Slack® blend several types of electronic communications into a single conversation. Thus, electronic files that underlie these types of email platforms may also be considered "electronic communication documents."

Generally, an electronic communication document may be viewed as a compilation of segments built upon one another. That is, a conversation may begin with a root communication. The root communication may be viewed as a one-segment electronic communication document. When a conversation participant replies to the root communication, the reply may include the response as well as the root segment. Accordingly, the reply may be considered a two-segment electronic communication document: a root segment and a segment comprising the participant's reply. The conversation may generally continue in this manner so that each new reply adds another segment to the generated electronic communication documents. When the conversation ends, an end communication may include a segment that corresponds to the end communication itself (an "end segment") and a segment that corresponds to each reply contained therein. Assuming the conversation did not fork, each electronic communication document includes a segment for each reply that preceded it in the conversation.

According to aspects, a staging process may analyze the corpus of electronic communication documents to only include electronic communication documents that convey new information in the generated output conversations. As one example, the copy of an end communication in the author's outbox may convey identical information as the copy in the inbox of each of its recipients. Thus, staging may attempt to include only one copy of the end communication. Traditionally, determining that these communications convey identical information required a character-wise comparison of the entire communication. As the conversations get larger, each comparison takes longer. Moreover, each communication may be compared against a growing number of potentially identical communications to determine uniqueness.

For at least the reason of reducing the processing time, the staging environment may instead generate one or more fingerprints for each electronic communication document. In some embodiments, the fingerprint may be based upon the output of a hash function or algorithm such as a Merkle-Damgård algorithm (e.g., MD5, MD6, etc.), a Secure Hash Algorithm (e.g., SHA-2, SHA-3, or the variants thereof), SWIFFT, and/or any other suitable hash function that produces a particular output for a given input. More particularly, generating the fingerprint may include executing the hash function on the concatenation of respective characteristics associated with each segment within the electronic communication document. According to aspects, the outputs of the hash function may be ordered to begin with the output corresponding to the root segment and ending with the output corresponding to the top-level segment. Consequently, whether or not a staging process includes a particular electronic communication document in an output conversation may be based, in part, upon whether another electronic communication document has the same fingerprint, and not whether the electronic communication document is a character-wise match with another electronic communication document.

In some embodiments, a delimiter character may be utilized to separate the hash function outputs corresponding to each segment contained within the electronic communication document. The delimiter character may indicate whether or not the preceding segment is included in the conversation as a standalone electronic communication document. For example, a delimiter of "+" may be used to indicate that the preceding segment has been included in the conversation as a standalone electronic communication document and a delimiter of "−" may be used to indicate that the preceding segment has not been included in the conversation as a standalone electronic communication document. In this example, the last character of a fingerprint may be the delimiter characterizing the end communication document. It should be appreciated that because end communication documents tend to convey new information, in this example, most fingerprints may end with the inclusion-indicating delimiter.

According to aspects, the output of many hash functions is over 128 bits long. While this number of bits is typically fewer than the number of characters in a given electronic communication document, processing of the output may still be optimized further. To this end, a hash of 128+ bits may offer more uniqueness than necessary to identify duplicate electronic communication documents. Thus, based on the number of electronic communication documents in the corpus of electronic communication documents, the output of the hash function may be truncated to only a threshold number of characters. In some embodiments, as few as the first 6-10 bits may offer sufficient uniqueness to perform the techniques described herein. As a result, the processing time for the comparison step may be reduced even further.

By replacing conventional staging techniques with one or more of the staging techniques described herein, problems that have made electronic communication threading too processor intensive to be practical may be overcome. As described above, duplicate electronic communication documents may be more quickly and/or more efficiently determined by generating and comparing fingerprints as opposed to the electronic communication documents themselves. This technical improvement to the staging platform itself may, in turn, allow various other manual and/or automated tasks (e.g., human review of documents during litigation discovery) to proceed more efficiently and/or effectively.

II. Example Environment for Electronic Communication Threading

FIG. 1 depicts an example environment 100 in which a corpus of electronic communication documents 105 is staged for analysis via a content analysis platform 120, according to one embodiment. In an embodiment, the corpus 105 may include electronic communication documents for a company that comply with a discovery request. The corpus 105 may be ingested into a staging platform 110 to organize the corpus 105 in a manner that facilitates efficient analysis via the content analysis platform 120. The corpus 105 may be ingested into the staging platform 110 by executing a computer program on a computing device that has access to the environment 100. According to aspects, the ingestion process may involve the computer program providing an instruction to the staging platform 110 as to a location at which the corpus 105 is stored. Using this location, the staging platform 110 may then be able to access the corpus 105 for performing the threading techniques described herein.

The staging platform 110 may then analyze the corpus 105 to generate a plurality of threaded conversations 115a-n. According to aspects, the staging platform 110 may analyze the corpus 105 to locate and assign each root communication a unique conversation index. Each of these root communications may form the basis of one of the conversations 115a-n (with n representing the number of root communications). The staging platform 110 may then build each conversation 115 to include only the electronic communication documents that convey new information. For example, the conversations 115 may exclude duplicates of the same communication stored in different inboxes and/or exclude communications that have been entirely subsumed into a later transmitted communication. The staging platform 110 may store the resulting conversations 115 in a conversation database (not depicted).

As part of generating the conversations 115, the staging platform may generate and assign each electronic communication document one or more fingerprints. With concurrent reference to FIG. 2, depicted is an example electronic communication conversation within the corpus 105 and the corresponding fingerprints generated for each electronic communication document therein. Starting with the upper left electronic communication document, the depicted electronic communication is a root communication. As such, this electronic communication document only contains a single segment (the root segment or segment 0). Accordingly, when generating a fingerprint for this electronic communication document, the staging platform 110 may input the concatenation of the corresponding characteristics of the root segment into a hash function. In one example, the hash function may generate an output that truncates to 28233c. The staging platform 110 may append an appropriate delimiter to the output of the hash function to generate the fingerprint for the electronic communication document.

Turning now to the lower left electronic communication document, depicted is an electronic communication document where a participant replied to the root electronic communication document. This electronic communication document contains two segments, the root segment, and a new segment (segment 1) indicative of the participant's response. When the staging platform 110 generates the fingerprint for this electronic communication document, the staging platform 110 may input the concatenation of the corresponding characteristics for each of these segments into the hash function separately. In one example, the hash function may generate an output that truncates to 23233c and 6fb18d, respectively for the root and first segments. It should be appreciated that because the root segment was unmodified, the output of the hash function for the root segment truncates to the same value as determined when generating the fingerprint for the root electronic communication document. Again, the staging platform 110 may append an appropriate delimiter to the truncated outputs to generate the fingerprint for the electronic communication document.

Similarly, the rightmost electronic communication document represents a reply to the lower left electronic communication document. Accordingly, this electronic communication document contains three segments. In generating the fingerprint for this electronic communication document, the staging platform 110 may again input the concatenation of the corresponding characteristics of each segment into the hash function individually. In one example, the hash function may generate an output that truncates to 23233c, 6fb18d, and ef45b5, respectively, for segments 0, 1, and 2.

The staging platform 110 may generally continue in this manner until each electronic communication document within each conversation is assigned a fingerprint. As will be described in more detail below, the staging platform 110 may then compare these fingerprints to generate the plurality of threaded conversations 115. After the staging platform 110 finishes generating the conversations 115, the conversations 115 may then be ingested into the content analysis platform 120. In some embodiments, the content analysis platform may include an electronic document review (EDR) interface that enables one or more reviewers to analyze the conversations to determine whether or not the conversations 115 include any information relevant to the discovery process. In some embodiments, the content analysis platform 120 may additionally or alternatively include a conceptual indexing tool that performs clustering and/or other techniques on the conversations 115 to assist in the analysis.

Figure 3:
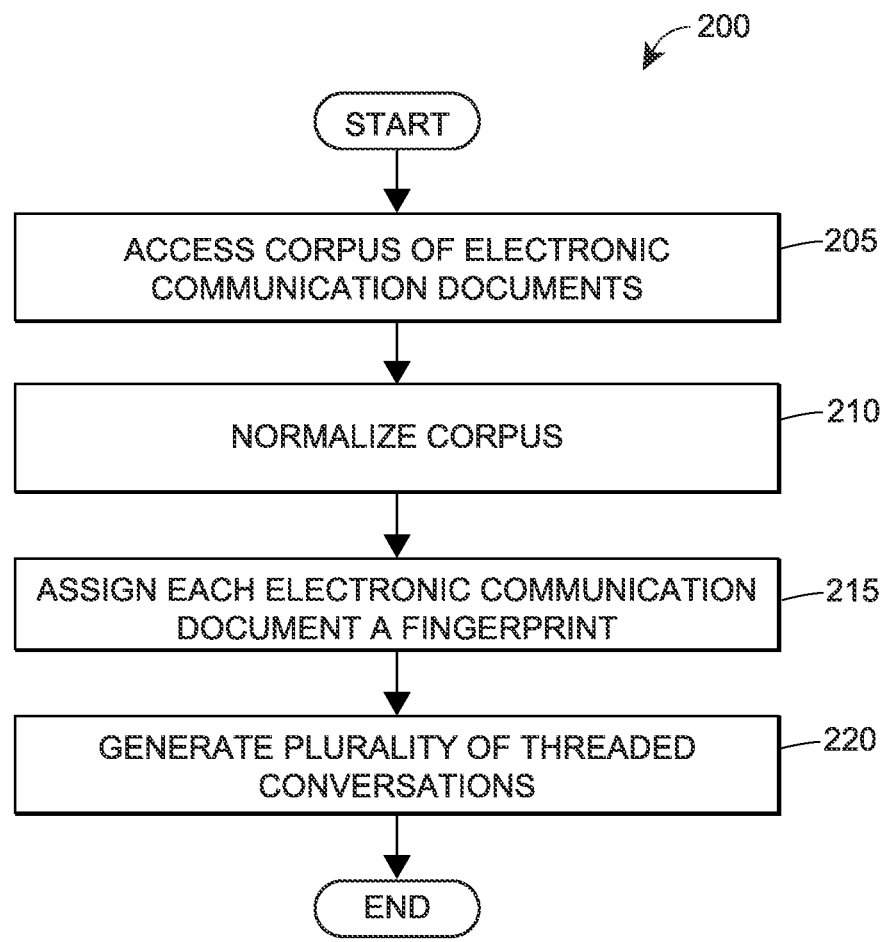
FIG. 3 depicts a flow diagram of an example method for ingesting a corpus of electronic communication documents based upon fingerprinting techniques, according to one embodiment.

III. Example Methods for Ingesting a Corpus of Electronic Communication Documents Using Fingerprinting FIG. 3 depicts a flow diagram of an example method 200 for ingesting a corpus of electronic communication documents based upon fingerprinting techniques, according to one embodiment. The method 200 may be implemented by one or more processors of one or more computing devices, such as the staging platform 110 of FIG. 1, for example.

The method 200 may begin when the staging platform accesses a corpus of electronic communication documents, such as the corpus 105 of FIG. 1 (block 205). To this end, a user may first interact with a computer program to provide the staging platform access to the corpus. The computer program may execute entirely on the staging platform and/or be accessible via a web browser executing on a client device. In one scenario, the corpus is stored at a location already accessible by the staging platform. In this scenario, the computer program may enable the user to provide the location (e.g., a directory, a drive, a memory block) where the corpus currently resides. Accordingly, the staging platform may access the corpus at the user-provided location. In another scenario, the user may interact with the computer program to upload or otherwise copy the corpus of electronic communication documents to the staging platform. In this scenario, the staging platform may store and access the corpus at a location and/or workspace specifically optimized for the threading techniques described herein.

After receiving access to the corpus, the staging platform may begin processing the corpus via the steps at blocks 210-220 to generate a plurality of threaded conversations. The steps at blocks 210-220 may be performed in parallel for different portions of the corpus. For example, the staging platform may contain any number of parallel processing units, including units at a processor level (e.g., a multicore processor or a GPU/CPU arrangement), and/or units at a server level via cloud computing techniques. Accordingly, the staging platform may divide the corpus into a plurality of subsets of electronic communication documents that are processed in parallel by the parallel processing units. Although the below description of the steps performed at blocks 210-220 generally refer to the processors of the staging platform acting upon the entire corpus, it should be appreciated that in implementations that utilize these parallel processing technique, any particular processing unit of the staging platform may only act upon a subset of the corpus.

According to aspects, the staging platform may normalize the electronic communication documents within the corpus (block 210). As it is generally used herein, normalization refers to the process of removing insignificant differences between electronic communication documents that were created due to particularities of the communication platform. For example, many communication documents are time stamped based on the local time of a user. If an author and a recipient are in different time zones, the copy of the communication in the outbox of the author and the copy of the communication in the inbox of the recipient may have different time stamps. Accordingly, the staging platform may detect that two or more electronic communication documents are identical, except the hour parameter of the respective timestamps. In this example, the normalization may involve setting the timestamp of each of the detected electronic communication documents to a common value, such as, for example, the timestamp based on the author's time zone.

As another example, many electronic communication platforms enable users to save a locally-used nickname for their contacts. The electronic communication platform may be configured to replace the origination address with this nickname. Because these nicknames are only locally-used, when two different users receive an electronic communication document from the same author, the received electronic communication document may contain different strings indicative of the author. Accordingly, as part of the normalization process, the staging platform may associate each conversation participant with a centralized name, as well as any locally-provided nicknames utilized by any user that received the electronic communication document. If the staging platform detects that an electronic communication document includes a nickname (i.e., a non-preferred name), the staging platform may replace the nickname with the preferred name. As a result, the staging platform may also be capable of normalizing any discrepancies arising due to the use of local nicknames. In addition to time and/or author, the staging platform may normalize any other appropriate value in accordance with the particularities of the electronic communication platform.

After normalizing the electronic communication documents within the corpus, the staging platform may then generate one or more fingerprints for each electronic communication document (block 215). This generation of the fingerprints may occur in a similar manner as described above with respect to FIGS. 1 and 2. In some embodiments, each electronic communication document may be associated with a fingerprint based on the truncated output of the hash function for the concatenation of the author and date corresponding to each segment therein and/or a fingerprint based on the truncated output of the hash function for the concatenation of the author, date, and body corresponding to each segment therein.

In some embodiments, in addition to generating the fingerprints, the staging platform may also assign each electronic communication document an index. The index may be formatted similar to the fingerprint in that it may include an index number for each segment within the electronic communication document separated by a delimiter. To this end, each root segment may be assigned a sequential index number. Then, moving to the next tier, each segment based on the same parent segment may be assigned another sequential index number. For example, an index for two different replies to a root communication may have indexes of FFF999+000001 and FFF999+000002. The indexing process may proceed in this manner until each tier of electronic communication documents and/or their corresponding segments are assigned an index. Returning to the previous example, a reply to the first reply to the root communication may have an index of FFF999+000001+ 000001.

After each electronic communication document is associated with at least one fingerprint and/or an index, the staging platform may then analyze these values to generate a plurality of threaded conversations (block 220). A conversation may represent the information contained within the collection of electronic communication documents that derive from the same root electronic communication document. Accordingly, the staging platform may generate a separate conversation for each root electronic communication document. However, as described above, simply including each electronic communication document sharing the same root electronic communication document will include many duplicate copies of the same information.

Instead, according to aspects, the staging platform may analyze the collection of electronic communication documents sharing the same root document to generate a threaded version of the conversation. Threading may including determining a minimal set of documents that captures all of the information communicated within the conversation. One way to reduce the size of the conversation is to not include duplicate copies of the same electronic communication document. Accordingly, if multiple electronic communication documents within the conversation have the same fingerprint, the threaded conversation may only include one of those electronic communication documents.

Similarly, if an electronic communication document is subsumed into a later-transmitted electronic communication document, the information conveyed in the earlier-transmitted electronic communication document will be captured by the later-transmitted electronic communication document. Accordingly, if a fingerprint is contained within another fingerprint of a later-transmitted electronic communication document, only the later-transmitted electronic communication document may be included in the threaded conversation. As an example, document 1 may have a fingerprint of abc123+xyz789+ and document 2 may have a fingerprint of abc123+xyz789+jk1456+. In this example, because document 2 has the fingerprint of document (abc123+xyz789+) within its fingerprint, document 2 may be included in the threaded conversation whereas document 1 is not. Similarly, if there is now a document 3 having a fingerprint of abc123+xyz789+jk1456+555zzz+, document 3 may be included in the threaded conversation whereas both documents 1 and 2 are excluded.

According to aspects, as part of generating the conversation, the staging platform may also identify and flag any electronic communication documents that likely modified an earlier segment within the electronic communication document. As it is generally used herein, the modified segment may be referred to as a "mutated segment." For example, an electronic communication client may automatically append a confidentiality notice whenever its user transmits a communication. These confidentiality notices are usually appended to the bottom of the electronic communication document. Based on how electronic communication documents are segmented as described herein, this confidentiality notice may be analyzed as if it were part of the body of the root communication. Thus, when the fingerprint is generated for the electronic communication document that included the confidentiality notice, the truncated output of the hash function based upon the characteristics of the root segment may have changed. Accordingly, this root segment may be considered a mutated segment. Naturally, other implementations may involve information other than confidentiality footers appended to electronic communication documents. Accordingly, the appending of this other information may also cause the root segment to be a mutated segment. In another example, some types of electronic communications enable an author to reply "in-line." That is, the author may respond by modifying an earlier-transmitted segment to include new information. As a result, the earlier-transmitted segment that includes the in-line response may also be considered a mutated segment.

To detect the mutated segment, the staging platform may analyze each electronic communication document within a conversation. As an example that utilizes an author-date-body fingerprint to detect included footers, the staging platform may generate a fingerprint of 473aa2+ for the root electronic communication document. Assume now a participant replies to the root electronic communication document, automatically including a footer in the reply. In generating the fingerprint for this reply, the truncated output of the hash for the reply segment of the electronic communication document that included the footer may be c94af8. However, because the footer is treated as if it is part of the body of the root segment, instead a truncated output of 473aa2 for the root segment, the truncated output may instead be f0f0d4. Thus, the staging platform may generate a fingerprint of f0f0d4+c94af8+ for the participant's reply. According to aspects, the staging platform may detect that the truncated output for the root segment has changed since it was calculated for the root document. As a result, the staging platform may flag the root segment as a mutated segment.

In a more general scenario, when an author is capable of responding in-line, the author may mutate the body of any prior segment, including the root segment. Accordingly, the staging platform may compare the truncated outputs of the hash function for each segment to the corresponding truncated outputs in generating the fingerprint of the parent electronic communication document. If the staging platform detects that there is a variance between truncated hash outputs corresponding to the same segment, it is indicative that the author of the child electronic communication document replied in-line to the parent electronic communication document by modifying. More particularly, it is indicative that the author of the child electronic communication document modified the segment that corresponds to the non-matching truncated hash outputs. Therefore, the staging platform may flag this modified segment as a mutated segment.

In some embodiments, the staging platform may flag a particular segment as being a mutated segment by using a particular delimiter, for example, "#," after the truncated hash output of corresponding to the mutated segment as part of the fingerprint. It should be appreciated that after the segment has become mutated, any subsequent electronic communication document may be expected to include the same mutation. Accordingly, when the staging platform analyzes whether a child of the electronic communication document conveys new information, the staging platform may ensure the child has the same mutated truncated hash output, and not the original truncated hash output.

It should be appreciated that mutated segment flagging generally relies upon the body of the segment being included as an input into the hash function. Thus, any fingerprint that includes the body, such as an author-date-body fingerprint, may be utilized to identify and flag mutated segments. However, in some embodiments, the staging platform may generate the plurality of threaded conversations without identifying and flagging the mutated segments. As a result, the staging platform may not need to include the body as an input to the hash function. In these embodiments, to save processing time, the staging platform may instead use an author-date fingerprint.

After the staging platform has generated the plurality of threaded conversations, the staging platform may export the plurality of threaded conversations for use by a content analysis platform, such as the content analysis platform 120. In some embodiments, the export may transmit a location at which the plurality of threaded conversations are stored. In other embodiments, the export may involve copying the plurality of threaded conversations to a server associated with the content analysis platform.

Figure 4:
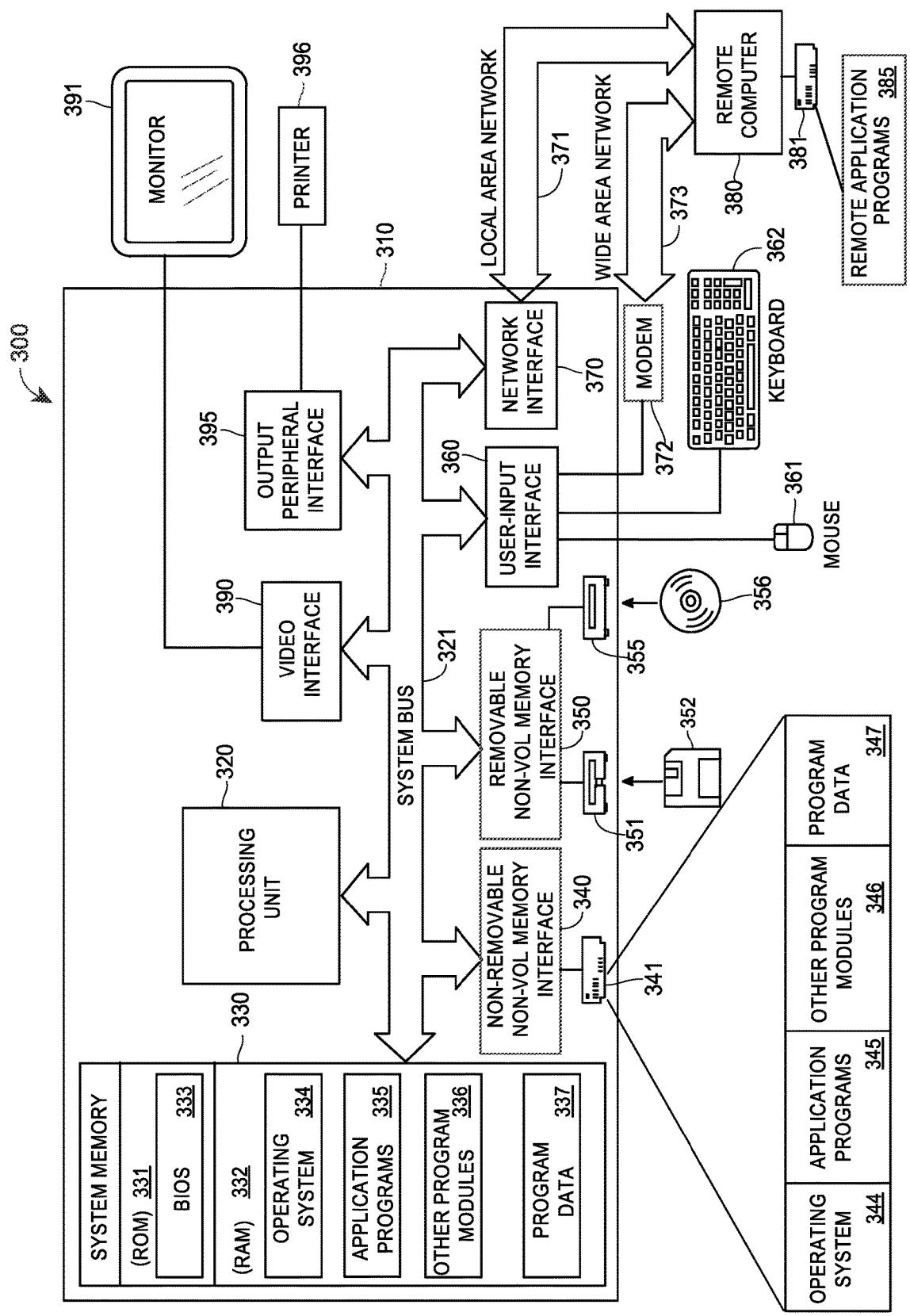
FIG. 4 depicts an example computer system in which the techniques described herein may be implemented, according to one embodiment.

IV. Example Computer System for Identification and Grouping of Likely Textual Near-Duplicates FIG. 4 depicts an example computer system 300 in which the techniques described herein may be implemented, according to an embodiment. The computer system 300 of FIG. 5 may include a computing device in the form of a computer 310. Components of the computer 310 may include, but are not limited to, a processing unit 320, a system memory 330, and a system bus 321 that couples various system components including the system memory 330 to the processing unit 320. In some embodiments, the processing unit 320 may include one or more parallel processing units capable of processing data in parallel with one another. The system bus 321 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 310 may include a variety of computer-readable media. Computer-readable media may be any available media that can be accessed by computer 310 and may include both volatile and nonvolatile media, and both removable and non-removable media. By way of example, and not limitation, computer-readable media may comprise computer storage media and communication media. Computer storage media may include volatile and nonvolatile, removable and non-removable media implemented in any method or technology for storage of information such as computer-readable instructions, data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310.

Communication media typically embodies computer-readable instructions, data structures, program modules or other data in a modulated data signal such as a carrier wave or other transport mechanism, and may include any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared and other wireless media. Combinations of any of the above are also included within the scope of computer-readable media.

The system memory 330 may include computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to, and/or presently being operated on, by processing unit 320. By way of example, and not limitation, FIG. 4 illustrates operating system 334, application programs 335, other program modules 336, and program data 337.

The computer 310 may also include other removable/non-removable, volatile/nonvolatile computer storage media. By way of example only, FIG. 4 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 may be connected to the system bus 321 through a non-removable memory interface such as interface 340, and magnetic disk drive 351 and optical disk drive 355 may be connected to the system bus 321 by a removable memory interface, such as interface 350.

The drives and their associated computer storage media discussed above and illustrated in FIG. 4 provide storage of computer-readable instructions, data structures, program modules and other data for the computer 310. In FIG. 4, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as cursor control device 361 (e.g., a mouse, trackball, touch pad, etc.) and keyboard 362. A monitor 391 or other type of display device is also connected to the system bus 321 via an interface, such as a video interface 390. In addition to the monitor, computers may also include other peripheral output devices such as printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and may include many or all of the elements described above relative to the computer 310, although only a memory storage device 381 has been illustrated in FIG. 4. The logical connections depicted in FIG. 4 include a local area network (LAN) 371 and a wide area network (WAN) 373, but may also include other networks. Such networking environments are commonplace in hospitals, offices, enterprise-wide computer networks, intranets and the Internet.

When used in a LAN networking environment, the computer 310 is connected to the LAN 371 through a network interface or adapter 370. When used in a WAN networking environment, the computer 310 may include a modem 372 or other means for establishing communications over the WAN 373, such as the Internet. The modem 372, which may be internal or external, may be connected to the system bus 321 via the input interface 360, or other appropriate mechanism. The communications connections 370, 372, which allow the device to communicate with other devices, are an example of communication media, as discussed above. In a networked environment, program modules depicted relative to the computer 310, or portions thereof, may be stored in the remote memory storage device 381. By way of example, and not limitation, FIG. 4 illustrates remote application programs 385 as residing on memory device 381.

The techniques for generating threaded conversations based upon a corpus of electronic communication documents described above may be implemented in part or in their entirety within a computer system such as the computer system 300 illustrated in FIG. 4. The computer 310 may be staging platform 110 of FIG. 1, for example, and the remote application programs 385 may include the computer program for ingesting the corpus into the computer 310 described with respect to block 205 of FIG. 3. Moreover, the plurality of threaded conversations 115*a-n* and/or the corpus of electronic communication documents 105 of FIG. 1 may be stored in hard disk drive 341 (e.g., as program data 347), magnetic disk 352 and/or optical disk drive 355. In other embodiments, the computer 310 may be a client device that is used to access user-facing features of staging process (e.g., to view documents flagged for potentially being modified post hoc, to review the accuracy of the inclusion decisions, etc.), the remote computer 380 may be a server, the computer program for ingesting the corpus into the computer 310 described with respect to block 205 of FIG. 3 may be included in remote application programs 385, and/or the plurality of threaded conversations 115*a-n* and/or the corpus of electronic communication documents 105 of FIG. 1 may be stored in the remote memory storage device 381 or another remote storage location.

V. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for identifying and grouping likely textual near-duplicates through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method, implemented by one or more processors of a computing system, the method comprising:
    generating, by the one or more processors, fingerprints for electronic communication documents within a corpus of electronic communication documents, wherein the fingerprints are derived from outputs of a hash function associated with each segment within the electronic communication documents, wherein the fingerprints for the electronic communication documents are formed by:
        associating, by the one or more processors, the respective outputs of the hash function with a respective delimiter, and
        concatenating, by the one or more processors, the respective outputs and the respective delimiters for each segment within the electronic communication documents; and
    based upon the fingerprints, generating, by the one or more processors, a plurality of threaded conversations from the corpus of electronic communication documents.

2. The method of claim 1, wherein generating the fingerprint comprises:
    truncating, by the one or more processors, the respective outputs of the hash function to include only a threshold number of characters.

3. The method of claim 1, wherein generating the fingerprint comprises:
    deriving, by the one or more processors, the fingerprint based upon the respective outputs of the hash function for an author and a date of each segment within the electronic communication document.

4. The method of claim 1, wherein the delimiter indicates whether or not the electronic communication document or a segment thereof is included in a conversation of the plurality of threaded conversations.

5. The method of claim 1, wherein the delimiter indicates that a segment is a mutated segment.

6. The method of claim 1, wherein generating the fingerprint comprises:
    deriving, by the one or more processors, the fingerprint based upon the respective outputs of the hash function for the author, the date, and a body of each segment within the electronic communication document.

7. The method of claim 1, further comprising:
    the fingerprint being a first fingerprint, wherein the first fingerprint is derived from the respective outputs of the hash function of the author and the date for each segment within the electronic communication document; and
    assigning, by the one or more processors, a second fingerprint to the electronic communication document, wherein:
        the second fingerprint is derived from respective outputs of the hash function of the author, the date, and a body for each segment within the electronic communication document.

8. The method of claim 1, wherein generating the plurality of threaded conversations from the corpus of electronic communication documents comprises:
    comparing, by the one or more processors, a generated fingerprint of a particular electronic communication document within a conversation to a generated fingerprint of another electronic communication document within the conversation; and when the generated fingerprints of the particular electronic communication document and the other electronic communication document match, excluding one of the particular electronic communication document or the other electronic communication document from a corresponding threaded conversation.

9. The method of claim 1, wherein generating the plurality of threaded conversations from the corpus of electronic communication documents comprises:

comparing, by the one or more processors, a generated fingerprint of a particular electronic communication document within a conversation to a generated fingerprint of a child electronic communication document within the conversation; and when the generated fingerprint of the particular electronic communication document is subsumed into the generated fingerprint of the child electronic communication document, excluding the particular electronic communication document from a corresponding threaded conversation.

10. The method of claim 1, further comprising:
exporting, by the one or more processors, the plurality of threaded conversations to a content analysis platform.

11. A system for staging a corpus of electronic communication documents, the system comprising:

a computing device comprising one or more processors and a memory storing non-transitory, computer-readable instructions that, when executed by the one or more processors, cause the computing device to:

generate fingerprints for electronic communication documents within a corpus of electronic communication documents, wherein the fingerprints are derived from respective outputs of a hash function associated with each segment within the electronic communication documents, wherein the fingerprints for the electronic communication documents are formed by:

associating the respective outputs of the hash function with a respective delimiter, and concatenating the respective outputs and the respective delimiters for each segment within the electronic communication documents; and based upon the fingerprints, generate a plurality of threaded conversations from the corpus of electronic communication documents.

12. The system of claim 11, wherein the computing device is interconnected with one or more parallel processing units and each parallel processing unit processes a respective subset of the corpus of electronic communication documents in parallel.

13. The system of claim 11, wherein to generate the fingerprint, the instructions, when executed by the one or more processors, cause the computing device to:

truncate the respective outputs of the hash function to include only a threshold number of characters.

14. The system of claim 11, wherein to generate the fingerprint, the instructions, when executed by the one or more processors, cause the computing device to:

derive the fingerprint based upon the respective outputs of the hash function for an author and a date of each segment within the electronic communication document.

15. The system of claim 11, wherein to derive the fingerprint for a particular electronic communication document, the instructions, when executed by the one or more processors, cause the computing device to:

detect that a segment within the particular electronic communication document is a mutated segment.

16. The system of claim 15, wherein to detect that a segment is a mutated segment, the instructions, when executed by the one or more processors, cause the computing device to:

compare the respective outputs of the hash function for each segment within the particular communication document to the corresponding respective outputs of the hash function for the corresponding segment within a parent electronic communication document; and when the corresponding hash outputs for the corresponding segments do not match, flag the corresponding segment within the particular electronic communication document as a mutated segment.

17. The system of claim 16, wherein to flag the corresponding segment within the particular electronic communication document as a mutated segment, the instructions, when executed by the one or more processors, cause the computing device to:

associate the corresponding segment within the particular electronic communication document to a particular delimiter that indicates that the corresponding segment within the particular electronic communication document is a mutated segment.

18. The system of claim 11, wherein to generate the plurality of threaded conversations from the corpus of electronic communication documents, the instructions, when executed by the one or more processors, cause the computing device to:

compare a generated fingerprint of a particular electronic communication document within a conversation to a generated fingerprint of another electronic communication document within the conversation; and when the generated fingerprints of the particular electronic communication document and the other electronic communication document match, exclude one of the particular electronic communication document or the other electronic communication document from a corresponding threaded conversation.

19. The system of claim 11, wherein to generate the plurality of threaded conversations from the corpus of electronic communication documents, the instructions, when executed by the one or more processors, cause the computing device to:

compare a generated fingerprint of a particular electronic communication document within a conversation to a generated fingerprint of a child electronic communication document within the conversation; and when the generated fingerprint of the particular electronic communication document is subsumed into the generated fingerprint of the child electronic communication document, exclude the particular electronic communication document from a corresponding threaded conversation.

20. A non-transitory computer-readable storage medium storing processor-executable instructions, that when executed cause one or more processors to:

generate fingerprints for electronic communication documents within a corpus of electronic communication documents, wherein the fingerprints are derived from respective outputs of a hash function associated with each segment within the electronic communication documents, wherein the fingerprints for the electronic communication documents are formed by:

associate the respective outputs of the hash function with a respective delimiter
concatenate the respective outputs and the respective delimiters for each segment within the electronic communication documents; and
based upon the fingerprints, generate a plurality of threaded conversations from the corpus of electronic communication documents.

* * * * *